Patented May 1, 1945

2,374,681

UNITED STATES PATENT OFFICE 2,374,681

PHOSPHATIDE COMPOSITION

Percy L. Julian, Maywood, and Edwin W. Meyer, Evanston, Ill., assignors, by mesne assignments, to American Lecithin Company, Cleveland, Ohio, a corporation of Ohio No Drawing. Application July 25, 1941, Serial No. 403,993

4 Claims. (Cl. 252—1)

The present invention relates to phosphatides and particularly relates to a process for modifying some of the properties of phosphatides and mixtures containing phosphatides, and to the products produced thereby.

Phosphatides as commercially prepared from soybeans, corn oil, cottonseed oil, etc., are usually prepared containing some fat or oil in a minor proportion as a carrier for the phosphatides. The pure phosphatides have poor stability and the oil or fat acts as a stabilizer. The oils may either be the oils from which the phosphatide was obtained, or may be some other oil or fat such as cocoa butter. Soybean phosphatides as commercially prepared from the emulsion obtained by treating the oil with steam or water usually contain 55–65% phosphatides and about 35–45% oil. So called "cocoa butter lecithin" as commercially prepared usually contains around 20% cocoa butter.

The phosphatide-oil mixtures prepared are often of a solid or heavy consistency and frequently vary in consistency. Since the phosphatide mixtures are used almost exclusively in small amounts, in admixture with liquids and solids, in which uses its effectiveness is dependent, to a considerable extent, upon a uniform incorporation, it is very desirable that a fluid material of uniform consistency be employed.

Also there are numerous uses of phosphatides, which are emulsifying agents, in which the emulsifying property is undesirable. Among these uses may be mentioned the use in lubricating oils as a varnish inhibitor.

It is accordingly an object of this invention to provide a process for treating phosphatide and oil mixtures to control the viscosity.

A further object of this invention is to provide a process for treating phosphatides to destroy or lessen their emulsifying properties.

Another object is to provide a composition of phosphatides and oil having a lowered viscosity.

Another object is to provide phosphatides having decreased emulsifying properties.

Other objects will appear from the following description of the invention.

It has been found that the desired objects of the invention may be accomplished by treating a mixture of phosphatides and glyceride oil or fat with oil-soluble sulfonic acids, which are capable of reducing the pH value of the phosphatide. However, in order to bring about this reduced pH value it is important that the acid be thoroughly distributed throughout the mass. By adding an oil soluble sulfonic acid to a mixture of phosphatides and glyceride oil this lowering of the pH value is accomplished.

The amount of acid used may vary over a considerable range. For the reduction of fluidity, increasing amounts up to a certain point appear to produce increasingly lowered viscosity. Beyond this point the viscosity is not materially lowered, the most noticeable effect insofar as the viscosity is concerned being merely one of dilution.

The change in emulsifying properties appears to be dependent upon the nature of the charge or charges upon phosphatide molecule.

Compounds like phosphatides, of the lecithin variety are "zwitter ions" and have long been recognized as good emulsifying agents since they contain a large oil soluble residue in the molecule as well as water soluble groupings. Thus the amino groups and the phosphoric acid groups have a tendency to be attracted to water, while the fatty acid portions would tend to be attracted to the oil. By treating the phosphatide with acids the charges upon the "zwitter ions" which tend to cause water solubility are neutralized with a resulting decrease in water solubility and increase in oil solubility. Since the effect of the water attracting groups has been nullified or minimized, the tendency to emulsification is decreased.

As a consequence of the increased oil solubility of the phosphatide, the viscosity of the oil solution is decreased. Simultaneously, therefore, with the decreasing of the emulsifying properties a mixture of phosphatide and oil is more nearly a true solution than would be the case with the untreated phosphatide. Thus such a mixture would be of softer consistency.

As mentioned the addition of rather small amounts produce a decreased viscosity. However, the smaller amounts of acid do not materially reduce the emulsifying properties. Upon the addition of further amounts, however, a sharp break in the emulsifying properties of the material occurs and further additions do not appear to materially effect or decrease the emulsifying properties of the phosphatide. The sulfonic acids which are suitable for use in the present invention are those which are soluble in or readily dispersible in glyceride oils, such as benzene sulfonic acid, toluene sulfonic acid, etc. It is important that the acid materials be dispersed throughout the phosphatide mass and it is for this reason that compounds of good oil solubility are preferred. Acids which are not thoroughly dispersed, while showing some of the advantages of the present invention to the extent that they are dispersed are ot as desirable as the more readily dispersible or soluble acids.

EXAMPLE

To aliquot parts of a mixture of soybean phosphatides and soybean oil containing about 65 parts of phosphatide and 35 parts of soybean oil were incorporated varying amounts of benzene sulfonic acid by mixing the ingredients at about 80° C. for 20 to 30 minutes until the sulfonic acid was thoroughly dispersed and the viscosity had been reduced. The emulsifying properties were determined by the Navy emulsion test, which is United States Government Test No. 20.12, as follows:

40 ml. of water and 40 ml. of lubricating oil containing 0.1% of the phosphatide-oil-acid mixture, was added to a graduated cylinder. The cylinder was immersed in a heating liquid and a temperature of 180° F. was maintained during the tests. The mixtures were agitated for 5 minutes and allowed to stand at the test temperature for specified times. The material separated into three layers, an oil layer, a water layer and an emulsion layer. The number of mls. in the emulsion layers and the pH of the water layers were taken. The results are shown in table.

TABLE

*0.1% of phosphatide-glyceride-oil sulfonic acid mixture in emulsification tests*

| Per cent of benzene sulfonic acid used in emulsification tests | Ml. of emulsion | | | | pH of water layer |
|---|---|---|---|---|---|
| | 15 min. | 30 min. | 45 min. | 60 min. | |
| 2.0% | 1.0 | 1.0 | 1.0 | 1.0 | 4.77 |
| 3.5% | 1.5 | 1.0 | 1.0 | 1.0 | 4.37 |
| 5.0% | 2.05 | 2.0 | 2.0 | 2.0 | 4.03 |
| 7.0% | 3.0 | 2.5 | 2.0 | 2.0 | 3.90 |
| Crude phosphatide | 49.0 | 56.0 | 46.0 | 44.0 | 6.0 |

It is important, however, that the acid be uniformly distributed throughout the phosphatide mass. The amount of acid added will depend somewhat upon the particular composition of the phosphatide-oil mixture, upon the particular acid used, upon the particular viscosity desired, and upon the desired emulsifying properties. For the reduction of fluidity increasing the amounts up to a certain point appears to produce increasingly lowered viscosity. The change is emulsifying properties appears to be dependent upon the nature of the charge or charges upon the phosphatide molecule. Thus while rather small amounts produce desired viscosities a substantial reduction in emulsifying power does not occur upon the addition of the smaller quantities but appears to take place only upon the addition of a sufficient amount of acid to produce the proper reduction of the pH value of the mixture. pH values determined on the water layer formed by emulsifying lubricating oil with water and emulsifying the acid treated phosphatide-glyceride oil mixture indicate that the pH value at which substantial reduction in emulsifying begins generally lies in the range of pH 3.7 to 4.3 or approximately 4. Applicants, however, do not wish to be understood as meaning that the pH value of the water layer is necessarily or always a true indication of the pH value of the dry mixture itself or of the true condition of the charges upon the phosphatide molecule. The pH value obtained in the water layer may depend to some extent upon the amount of the particular acid dissolved in the water. However, the dry phosphatide-oil-mixture is of a lipophilic nature and consequently the pH of an aqueous solution of an acid may not necessarily represent the true condition of the charges upon the phosphatide molecule. The decrease in the emulsifying properties, however, does occur rather sharply and may be readily determined. While the emulsifying properties do not substantially decrease until this critical point is reached more acid may be added if desired and still produce the lowered viscosity and decreased emulsifying properties.

As previously indicated compositions of the present invention have numerous uses. In those cases where it is desired to use a more fluid mixture but at the same time retain the emulsifying properties, smaller amounts of acid may be employed so as to lower the viscosity without material reduction in the emulsifying property. In those cases in which the emulsifying property is undesirable or unimportant greater amounts of acid may be used.

Having described the invention what is claimed is:

1. A composition of matter consisting essentially of a vegetable phosphatide containing a small amount of an oil dispersible organic sulfonic acid uniformly dispersed throughout the phosphatide mass in a quantity up to about 7% by weight of the phosphatide and at least sufficient to increase the glyceride oil solubility of the phosphatide.

2. A composition of matter essentially of a vegetable phosphatide containing about 2% to 7% of an oil dispersible organic sulfonic acid by weight of the phosphatide uniformly dispersed throughout the phosphatide mass.

3. The composition of claim 1 in which the phosphatide is dispersed in a carrier of a glyceride oil.

4. The composition of claim 2 in which the phosphatide is dispersed in a carrier of a glyceride oil.

EDWIN W. MEYER.
PERCY L. JULIAN.